United States Patent [19]

Parr et al.

[11] 3,996,951

[45] Dec. 14, 1976

[54] SAFETY ROLL OVER VALVE

[75] Inventors: Erwin W. Parr; Timothy B. Brandt, both of Des Moines, Iowa

[73] Assignee: Parr Manufacturing Inc., Des Moines, Iowa

[22] Filed: Nov. 17, 1975

[21] Appl. No.: 632,223

[52] U.S. Cl. ............................................. 137/43
[51] Int. Cl.[2] ...................................... F16K 17/36
[58] Field of Search ........................ 137/38, 39, 43

[56] References Cited

UNITED STATES PATENTS

| 1,683,338 | 9/1928 | Evinrude | 137/43 |
| 2,676,708 | 4/1954 | Risk | 137/38 X |
| 3,910,302 | 10/1975 | Sudhir | 137/43 |

*Primary Examiner*—Robert G. Nilson
*Attorney, Agent, or Firm*—Henderson, Strom & Sturm

[57] ABSTRACT

A valve of a type used for preventing fuel line leaks which occur when automobiles or trucks roll over. The valve is used in conjunction with a vehicle fuel system, preferably in a vapor vent line which vents fuel vapors from the fuel tank, so that if the vehicle rolls over or tilts in one direction by more than a predetermined amount, the valve will close. A ball disposed in a conical recess within the valve body serves as a gravity actuator for a reciprocating valve member. A novel structure of a valve member of a particular configuration in combination with the novel configuration of the interior of the valve housing allows the valve member to be self-cleaning due to vibrations caused by vehicular travel; and yet, the valve provides a positive sealing function upon tipping or tilting thereof by a predetermined amount or more.

2 Claims, 6 Drawing Figures

U.S. Patent  Dec. 14, 1976  3,996,951
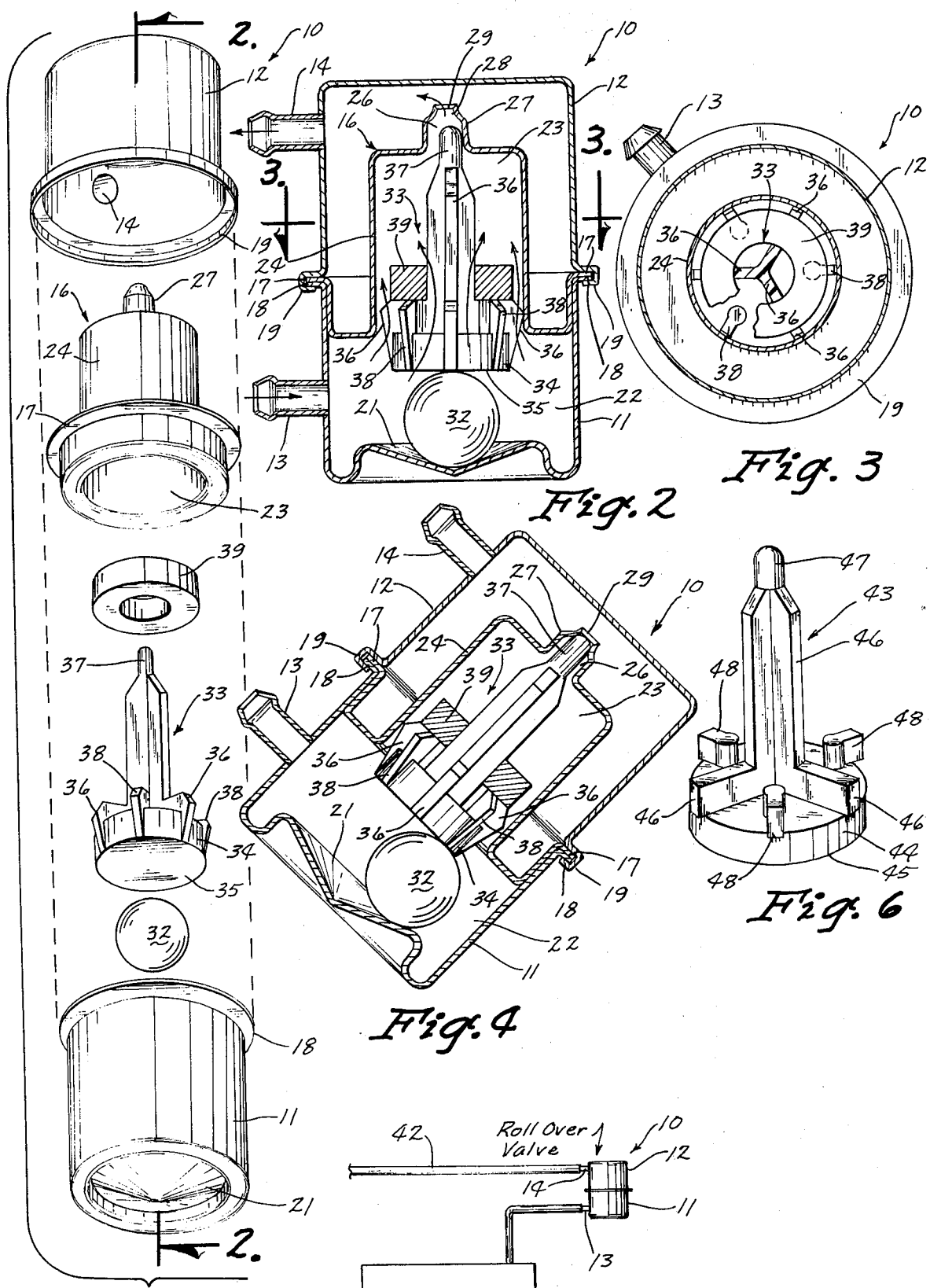

SAFETY ROLL OVER VALVE

BACKGROUND OF THE INVENTION

The present invention relates generally to valves and, more particularly, to a valve for use in vehicle fuel systems and functioning by remaining open during normal vehicular travel, but closing to prevent fuel line leaks when the vehicle partially or totally rolls over.

In many automobile accidents the occupants of the automobile would not be injured, or not be injured so severely, but for the occurrence of fires caused by the leakage of fuel from the automotive fuel system. This problem has been recognized for sometime and attempts have been made to prevent the leakage of fuel under such conditions. One of the solutions to this problem is proposed in U.S. Pat. No. 2,676,708 which relates to a valve designed to close when the valve is tilted by a predetermined amount from its original installed position. Although this type of valve has been known since the early 1950's, as evidenced by this patent, it has not achieved widespread commercial success. The reason for this is not clear, but it is surmised that a valve of this type could easily become jammed because of the tight fit of certain of the parts which are designed to slide with respect to each other. Small quantities of impurities would only tend to amplify this problem if they were to be deposited between the valving member and the bore in which it is to reciprocate.

SUMMARY OF THE INVENTION

The present invention relates to a valve for use in an automotive fuel system. The valve is operative to remain open when an automobile is in normal operation and is operative to close when the valve tilts to one side by at least a predetermined angle due to a corresponding tilting of the automobile itself. Novel structure is provided for allowing the valve member to vibrate when open. The vibration tends to keep foreign particles from clinging to the surface of the valve member and thereby serves a self-cleaning function. Even though the valve is somewhat loosely disposed in a pair of cylindrical cavities leading to a valve opening and valve seat, a tight and positive sealing action is achieved when the valve is tilted and thereby closed.

An object of the present invention is to provide a valve for preventing one type of fuel line leak for vehicles.

Another object of the invention is to provide a valve which will remain open except when it is tilted by a predetermined amount or more.

A further object of the present invention is to provide a self-cleaning valve of the type referred to above.

Other objects, advantages and novel features of the present invention will become apparent from the following detailed description of the invention when considered in conjunction with the accompanying drawings.

BRIEF DESCRIPTION OF THE DRAWINGS

FIG. 1 is an exploded perspective view of the valve of the present invention;

FIG. 2 is a cross-sectional view taken along line 2—2 of FIG. 1, and showing the valve in an open position;

FIG. 3 is a cross-sectional view of the valve of the present invention taken along line 3—3 of FIG. 2;

FIG. 4 is a cross-sectional view like that of FIG. 2 but showing the valve in a closed position;

FIG. 5 is a schematic view of the valve of the present invention shown installed in the vapor vent line which leads from the fuel tank to the charcoal cannister of an automobile or truck; and FIG. 6 shows another embodiment of the valve member of the present invention.

DESCRIPTION OF THE PREFERRED EMBODIMENTS

Referring now to the drawings wherein like reference numerals designate identical or corresponding parts throughout the several views, FIGS. 1–4 show a valve 10 having a lower housing portion 11 and an upper housing portion 12. The lower housing portion 11 has an inlet port 13 attached thereto and the upper housing portion 12 has an outlet 14 attached thereto. A partition member 16 has a radial flange 17 on the outermost portion thereof which rests on a flange 18 of the lower housing portion 11. A flange 19 of the upper housing portion 12 is clamped around the flanges 17 and 18 to form a fluid sealing joint as can clearly be seen in FIGS. 2 and 4.

The lower housing portion 11 has a conical surface 21 formed in the bottom end thereof and forming a portion of a first compartment 22. The first compartment 22 is comprised of the portion of the interior of the valve housing on the lower side of the partition member 16 and includes a first cylindrical cavity 23 formed by the cylindrical portion 24 of the partition member 16. Also comprising part of the first compartment is a second cylindrical cavity 26 formed by a cylindrical portion 27 of the partition member 16. A valve seat 28 is also disposed on the partition member 16 and surrounds an opening 29 formed centrally in the partition member 16.

When the valve is in the open position as shown in FIG. 2, the central opening 29 in the partition member 16 allows fluid communication between the first compartment 22 and a second compartment 31.

A ball 32, preferably made of a heavy metal material, is disposed in the first compartment 22 and rests on the conical surface 21. A valve member 33 is positioned above the ball 32 within the first compartment 22. The valve member 33 is composed of several parts which include a base section 34 having a camming surface 35 on the bottom side thereof. A plurality of fins 36 extend from the lower camming surface 35 to the valve head 37 of the valve member 33. Additional shorter fins 38 serve to maintain the valve in alignment but allow sufficient flow between the valve member 33 and the cylindrical portion 24 of the partition member 16. An annular weight 39, preferably of metal, is provided for adding any additional weight which might be necessary to cause closing of the valve at the precise angle desired. The extreme radially outer portions of the fins 36 and 38 remain at all times within the first cylindrical cavity 23 and consequently adjacent to the cylindrical wall 24. The majority of the fins, however, are always spaced slightly from the cylindrical portion 24 of the partition member 16. It is also noted that at least a portion of the valve head 37 always remains within the second cavity 26 formed by the cylindrical portion 27. This is important in conjunction with the fin structure 36 and 38 in order to allow the valve member 33 to be loosely retained in the first compartment 22, but yet being held sufficiently so that it will always close when required to do so. It is noted that the diameter of the first cavity 23 is substantially of a greater diameter than the distance across the widest portion of the valve member 33, which widest point occurs across the outermost part of the fins 36 as shown in FIG. 2, for example. Also, the diameter of the second cavity 26 is substantially larger than the diameter of the valve head 37 so that the valve member 33 can vibrate and strike the interior walls of the first and second cavity to thereby be assured that no deposits are built up on the valve member 33 or the partition member 16 which would hamper the movement of the valve member 33 with respect to the partition member 16.

In operation, the valve 10 as shown in FIG. 5 would be installed in the vapor vent line, a line which leads from the fuel tank to the charcoal cannister. The charcoal cannister, of course, is for the purpose of storing fuel vapors, which vapors are later drawn through the intake manifold and burned in the engine. The vapor vent line controls fuel tank emissions and the roll over valve 10 of the present invention would normally be installed only a few inches from the fuel tank, although this would not of course be critical. It is important that the valve initially be oriented in the position as shown in FIG. 2 and rigidly attached to the automobile so that tilting or rolling of the automobile would cause a corresponding tilting or rolling of the valve 10. Upon a predetermined tilting or rolling of the automobile and a corresponding tilting or rolling of the valve 10, the weight of the heavy ball 32, by inertia and gravity, will roll to a corresponding position around the periphery of the conical surface 21. This movement of the ball 32 and its corresponding pushing against the camming surface 35 of the valve member 33 will cause the valve member 33 to move to the position as shown in FIG. 4. This action causes the valve head 37 to seat against the valve seat 28 and thereby prevent the flow of fuel through the valve. This seating is enhanced because of the pressure on the lower, larger surfaces particularly since the flow tends to be from the inlet port 13. Increased pressure from the inlet port 13 will, of course, only tend to seat the valve more tightly because of the pressure against the valve member 33.

When the automobile and thereby the valve 10 is returned to a somewhat more vertical position, for example back to the position as shown in FIG. 2, the ball 32 will roll down the incline of the conical surface 21 so that the axis defining the center of the conical surface 21 will again pass through the center of the ball 32. When the ball is in this lowered position, the valve member 33 will also be in its lowered position whereby the valve head 37 is spaced from the valve seat 28 so that the fuel can again flow from the fuel tank 41 through the inlet port 13, through the chamber 22, the opening 29, the second compartment 31, the outlet port 14 and through the vapor vent line to the automobile charcoal cannister (not shown).

Referring to FIG. 6, it can be seen that another embodiment of the valve member 33 is shown as valve member 43. The valve member 43 is similar to the valve member 33 in many ways and has a base 44 with a camming surface 45 attached to the lower end thereof. A plurality of fins 46 extend from the base 44 and lead up to a valve head 47. A plurality of equally spaced smaller fins 48 are also attached to the base 44 and are aligned around the outer surface thereof to correspond with the alignment of the outer portion of the fins 46. It can be seen that the outer surfaces of the fins 46 and 48 extend beyond the base 44 to assure adequate space for the flow, as discussed above with respect to the fins 36 and 38 on the valve member 33. It is important to note that the outermost surfaces of the fins 46 and 48 are very short in length as compared to the length of the valve member 43. This is important because it allows the valve to tip as was described with respect to the valve member 33 above and in this way aids in the self-cleaning aspects of this valve and also prevents the valve member 43 from sticking or jamming as would be a problem if a cylindrically shaped valve member were to be used to slide within the first cavity 23 adjacent to the cylindrical wall portion 24 of the partition member 16.

Obviously many modifications and variations of the present invention are possible in light of the above teachings. It is therefore to be understood that, within the scope of the appended claims, the invention may be practiced otherwise than specifically described.

We claim:
1. A valve comprising:
   a housing;
   a chamber disposed in said housing;
   a partition member dividing said chamber into a first and a second compartment, said partition member having a first cylindrical cavity therein forming a part of said first compartment and having an open end, said partition member having a second cylindrical cavity formed therein in fluid communication with the other end of said first cylindrical cavity and forming another part of said first compartment, a central opening disposed in said partition member at one end of said second cylindrical cavity and having a valve seating surface therearound;
   an inlet port connected to said housing and being in fluid communication with one of said compartments;
   an outlet port connected to said housing and being in fluid communication with the other of said compartments;
   a valve member disposed in said first compartment, said valve member having a valve head on one end thereof extending into and located at all times in said second cavity, the other end of said valve having a camming surface thereon, fin means connected to said valve body and extending radially from said valve member intermediate the ends thereof for maintaining the valve member aligned in said first cavity and allowing fluid flow therearound, the radially outermost portion of said fin means being substantially shorter than said valve member to allow the valve member to tip about the outermost portion of the fin means;
   a conically shaped surface is disposed in said first compartment and having a central axis defining the center of the conically shaped surface, the axis of the conically shaped surface being substantially coincident with an axis defining the center of the central opening; and
   a ball being disposed in said first compartment and abutting the valve member on the camming surface thereof, said ball having a first position wherein the axis of the conically shaped surface extends through the center of the ball, said ball having a second position whereby said conical axis does not extend through the center of the ball, whereby in the second position, the ball forces the valve member to a position in which the valve head is in contact with the valve seating surface, said valve head being spaced from said valve seating surface when the ball is in the first position.
2. The valve as defined in claim 1 wherein at least a portion of said fins means are spaced from the interior walls of said first cavity at all times.

* * * * *